(12) United States Patent
Lazzeroni et al.

(10) Patent No.: US 9,398,620 B1
(45) Date of Patent: Jul. 19, 2016

(54) SIMULTANEOUS VOICE AND AUDIO TRAFFIC BETWEEN TWO DEVICES ON A WIRELESS PERSONAL-AREA NETWORK

(76) Inventors: John James Lazzeroni, Tucson, AZ (US); Melinda Kay Carevich, Tucson, AZ (US); James Dale Vertz, Tucson, AZ (US); Peter Edmund Heinrich Hauser, Kirkland, WA (US); Simon James Kingston, Woking (GB)

( * ) Notice: Subject to any disclaimer, the term of this patent is extended or adjusted under 35 U.S.C. 154(b) by 1510 days.

(21) Appl. No.: 12/634,431

(22) Filed: Dec. 9, 2009

(51) Int. Cl.
*H04B 7/00* (2006.01)
*H04W 76/02* (2009.01)

(52) U.S. Cl.
CPC .......... *H04W 76/02* (2013.01); *H04M 2250/04* (2013.01)

(58) Field of Classification Search
CPC ........... H04M 2250/02; H04M 1/7253; A01B 12/006
USPC .............. 455/41.2, 575.1, 575.2, 66.1, 569.1, 455/351, 345, 344
See application file for complete search history.

(56) References Cited

U.S. PATENT DOCUMENTS

| | | | | |
|---|---|---|---|---|
| 6,978,034 | B2 * | 12/2005 | Lazzeroni | A42B 3/30 379/430 |
| 6,978,162 | B2 * | 12/2005 | Russell | A42B 3/30 455/345 |
| 7,269,434 | B2 * | 9/2007 | Tabata | H04B 7/26 455/416 |
| 7,796,945 | B2 * | 9/2010 | Abbate | H04W 8/005 370/310 |
| 2006/0194604 | A1 * | 8/2006 | Dieringer | H04B 1/385 455/550.1 |
| 2006/0293092 | A1 * | 12/2006 | Yard | H04B 1/385 455/575.2 |
| 2010/0022189 | A1 * | 1/2010 | Coker | H04H 20/33 455/41.3 |

OTHER PUBLICATIONS

A begining guide to digital signal processing. p. 1 and 2.*
Business Wire, "Cardo Systems Launches the Scala-rider Q2(R)", Jan. 15, 2008, 2 pages, www.encyclopedia.com/doc/1G1-173907342.html.
Mobile Tech Review, "Cardo Scala Rider", Jun. 2006, 4 pages, www.mobiletechreview.com/tips/Cardo-Scala-Rider.htm.
CSR Press Release, "CSR Presents Handset Makers with Revolutionary Audio Processing Technology", 2 pages, Mar. 26, 2008, www.csr.com/pr/pr328.htm.
CSR Press Release, "CSR Music 'n' Voice Dongle Design Enables Versatile Headset Use in the Home", 2 pages, Oct. 30, 2007, www.csr.com/pr/pr306.htm.

* cited by examiner

*Primary Examiner* — Md Talukder
(74) *Attorney, Agent, or Firm* — Gavrilovich, Dodd & Lindsey LLP

(57) ABSTRACT

A wireless personal-area network (PAN) communication system includes a first device configured to simultaneously transmit a digitized stereo audio signal to and receive a digitized voice signal from a second device over the wireless PAN. The system also includes the second device, which is configured to simultaneously receive the digitized stereo audio signal from the first device and transmit the digitized voice signal to the first device over the PAN. The wireless PAN can be a Bluetooth® network. Low-latency audio codecs may be included in the first and second devices to reduce the latency of the voice and stereo audio signals transferred between the devices.

21 Claims, 3 Drawing Sheets

SIMULTANEOUS VOICE AND AUDIO TRAFFIC BETWEEN TWO DEVICES ON A WIRELESS PERSONAL-AREA NETWORK

BACKGROUND

1. Field

The present disclosure generally relates to wireless communications, and more specifically, to wireless personal-area networks.

2. Background

Wireless personal-area networks (PANs), such as Bluetooth®, are becoming increasingly popular. PANs allow short-range wireless communications between electronic devices over licensed or unlicensed radio frequencies. They are useful for a number of applications, such as wireless headsets, hands-free operation of devices such as cellular phones, remote controls and the like.

However, known Bluetooth® wireless PANs are not configured to support applications that require simultaneous transport of stereo audio and real-time voice signals between two devices.

One application that often requires the capability of simultaneous transfer of stereo audio and voice is motorcycles audio systems. For example, some motorcycle audio systems permit microphone signals and stereo audio to be transferred between the motorcycle's audio system and one or more headsets built into the riders' helmets. However, as they are presently known, these systems use a wire cable to carry the stereo audio and microphone signals between the headsets and the onboard audio system.

SUMMARY

There is therefore a need to "cut the cord", i.e., replace cable wiring with a wireless link, in applications that require a listener-perceived simultaneous transfer of stereo audio and voice signals between two connected devices. These applications may include motorcycle or vehicle audio systems, other communication systems, video games, and the like.

According to an aspect of the invention, a system includes a first device configured to simultaneously transmit a digitized stereo audio signal to and receive a digitized voice signal from a second device over a wireless personal-area network (PAN). The second device is configured to simultaneously receive the digitized stereo audio signal from the first device and transmit the digitized voice signal to the first device over the PAN.

According to another aspect of the invention, a system includes a dongle configured to plug into an analog audio jack of a motorcycle audio system. The dongle receives an analog audio signal from motorcycle audio system, and outputs an analog microphone signal to the motorcycle audio system. The dongle including means for converting the analog audio signal to a digitized audio signal, and means for converting a digitized microphone signal to the analog microphone signal. The dongle is also configured to simultaneously transmit the digitized audio signal and receive the digitized microphone signal over a wireless personal-area network (PAN).

According to another aspect of the invention, a method of wireless communication between two devices connected over a wireless personal-area network (PAN) includes establishing an upstream connection between a first device and a second device on the wireless PAN; establishing a downstream connection between the first device and the second device on the wireless PAN; transmitting a digitized stereo audio signal from the first device to the second device over the upstream connection; and transmitting a digitized voice signal from the second device to the first device over the downstream connection simultaneously with the transmission of the digitized stereo audio signal.

According to a further aspect of the invention, a computer-readable medium, embodying a set of instructions executable by one or more processors, includes code for establishing an upstream connection between a first device and a second device on a wireless personal-area network (PAN); code for establishing a downstream connection between the first device and the second device on the wireless PAN; code for transmitting a digitized stereo audio signal from the first device to the second device over the upstream connection; and code for simultaneously transmitting a digitized voice signal from the second device to the first device over the downstream connection.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the wireless communications described herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Figure 1:
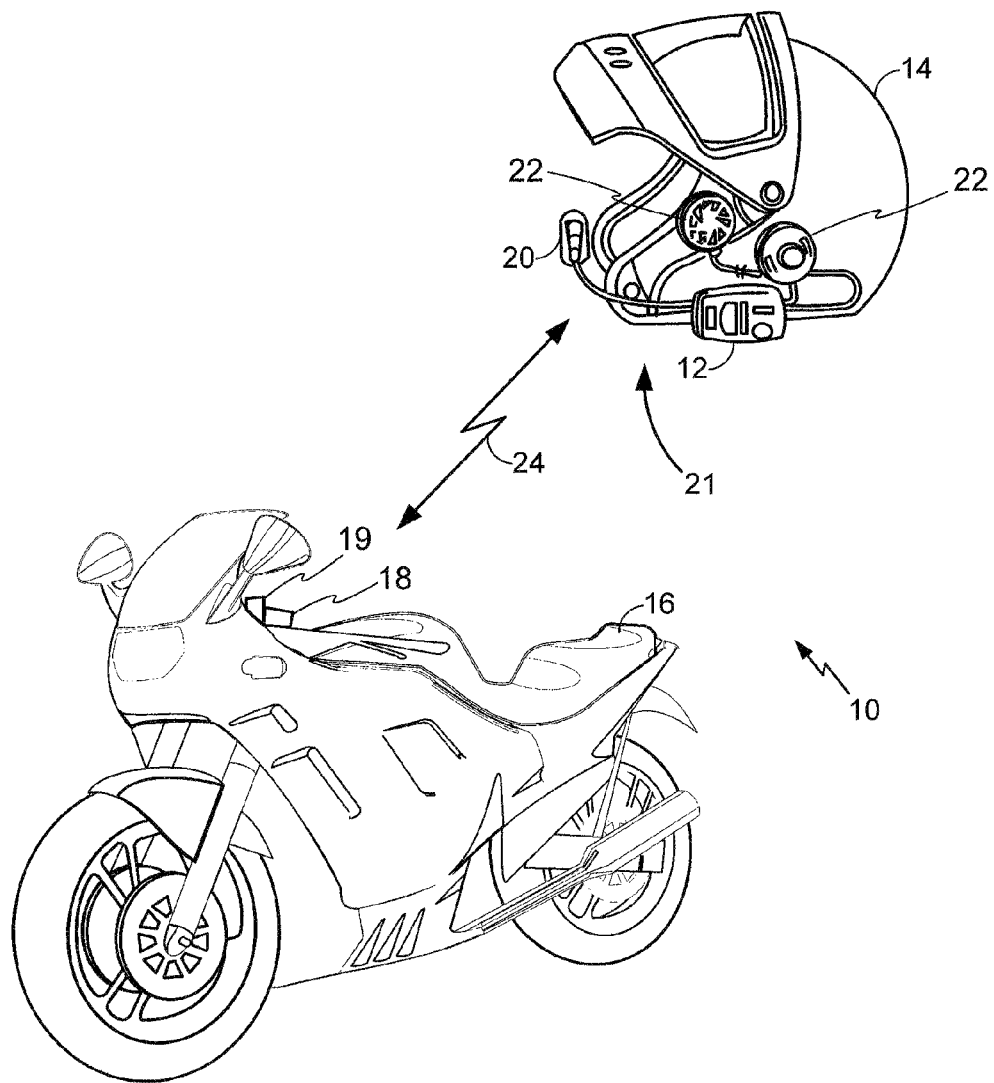
FIG. 1 is a diagram illustrating an exemplary wireless communication system supporting simultaneous transfer of stereo audio and voice between two connected devices.

FIG. 1 is a diagram illustrating an exemplary wireless communication system 10 supporting simultaneous transfer of stereo audio and voice signals between two connected devices. The system 10 provides wireless voice and stereo audio communications between a motorcycle helmet headset 21 and a motorcycle audio system 19 included on a motorcycle 16. The system 10 includes a first device, for example, a dongle 18, configured to simultaneously transmit a digitized stereo audio signal to and receive a digitized voice signal from a second device, e.g., the headset 21, over a wireless link 24. The headset 21 is configured to simultaneously receive the digitized stereo audio signal from the dongle 18, and transmit the digitized voice signal to the dongle 18 over the wireless link 24.

The motorcycle audio system 19 can be built into the motorcycle 16. The audio system 19 may source stereo audio from, for example, a radio, CD or tape player, or any other suitable source. The audio system 19 may also provide an intercom, CB radio and/or FRS radio for riders. The audio system 19 includes an analog jack (not shown) configured to output left and right channel analog stereo signals for conventional wired headsets and to receive an analog microphone (voice) signal from such headsets. The microphone signal may be a differential analog signal. The audio system 19 may mix an incoming microphone signal with stereo audio and output the mixed signal through the jack as the stereo audio signal. Alternatively, the audio system 19 may interrupt output from an audio source upon detecting an incoming microphone signal, and instead temporarily output only the microphone signal on one or both of the stereo audio channels.

The dongle 18 acts as an interface between the audio system 19 and the wireless headset 21. The dongle 18 includes a wiring harness (not shown) configured to removably plug into the analog audio jack of the motorcycle audio system 19. Through the harness, the dongle 18 receives the left and right channel analog stereo audio signals from the motorcycle audio system 19, and the dongle also outputs the analog microphone signal to the motorcycle audio system 19. The dongle 18 includes means for converting the analog stereo channels to a digitized stereo audio signal and means for converting a digitized microphone signal from the headset 21 to the analog microphone signal. The dongle 18 is also configured to simultaneously transmit the digitized stereo audio signal and receive the digitized microphone signal over the wireless link 24. To transmit and receive the wireless audio and microphone signals over the wireless link 24, the dongle 18 includes a wireless personal-area network (PAN) interface, such as a Bluetooth® module. The wireless audio and microphone signals may be exchanged between the headset 21 and dongle 18 using the A2DP Profile provided by Bluetooth Specification, which is available at www.bluetooth.com.

The headset 21 is preferably integrated into a motorcycle helmet 14, and it includes a wireless communications module 12, left and right speakers 22, and a microphone 20. Electrical wires connect the speakers 22 and microphone 20 to the module 12, for carrying analog stereo and microphone signals, respectively. The headset module 12 includes a wireless personal-area network (PAN) interface, such as a Bluetooth® module, for simultaneously transmitting the digitized microphone signal to and receiving the digitized stereo audio signals from the dongle 18 over the wireless link 24. The module 12 also include means for converting the digitized stereo audio signals received from the dongle 18 into analog left and right stereo channels for output at the speakers 22, and means for converting the incoming analog microphone signal from the microphone 20 into the digitized microphone signal.

Figure 2:
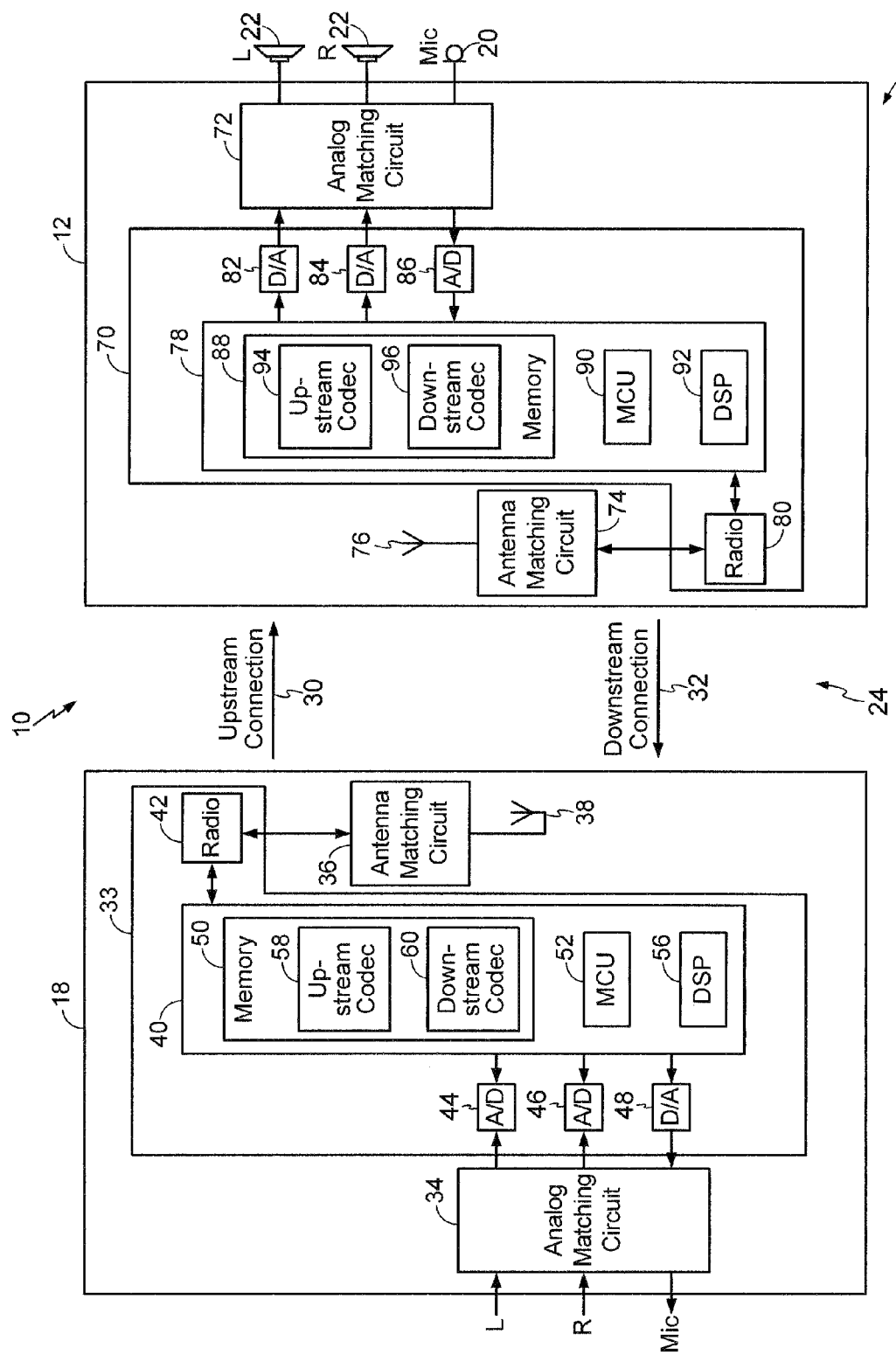
FIG. 2 is a block diagram showing certain components of the headset and dongle shown in FIG. 1.

FIG. 2 is a block diagram showing certain components of the headset 21 and the dongle 18 shown in FIG. 1.

The dongle 18 includes a PAN interface core 33 electrically coupled to an analog matching circuit 43 and an antenna matching circuit 36. The antenna matching circuit 36 is coupled to an antenna 38.

The analog matching circuit 34 receives analog left and right stereo audio signals from the harness, and outputs an analog microphone signal, which may be a differential signal, to the harness. The analog matching circuit 34 may include amplifiers, filters and other suitable hardware for tuning and adjusting the analog signals to a particular external audio system. The analog matching circuit 43 may be configured to match the volume of the microphone and stereo audio signals of an external audio system to the volume ranges of the headset 21. The analog matching circuit 34 outputs the analog stereo audio signals to the PAN interface core 33, and receives the analog microphone signal from the PAN interface core 33.

The PAN interface core 33 may be any suitable set of components for converting and digitally processing the microphone and stereo audio signals for transport over the wireless link 24. However, the PAN interface core 33 is preferably a system-on-a-chip solution, such as the BlueCore5-Multimedia chip available from CSR, Plc. of Cambridge, U.K., which provides a Bluetooth® core system consisting of a Bluetooth® RF transceiver, baseband processor, protocol stack, A/D and D/A converters, memory, DSP and codec resources, as well as hardware and software interfaces for connecting to the antenna matching circuit 36 and analog matching circuit 34.

In the example shown, the PAN interface core 33 includes a digital processing core 40, a first analog-to-digital (A/D) converter 44, a second A/D converter 46, a digital-to-analog (D/A) converter 48, and a radio 42. The first A/D converter 44 samples the left analog audio channel at a rate 48 KHz, and the second A/D converter 46 samples the right analog audio channel at the same rate. The digitized stereo audio channels from the A/D converters 44, 46 are received by the digital processing core 40. The D/A converter 48 receives the digitized microphone signal, which is sampled at a rate of 16 KHz, and outputs the analog microphone signal.

The digital processing core 40 includes at least one memory 50, a micro-controller unit (MCU) 52, and at least one digital signal processor (DSP) 56.

The memory 50 is any suitable memory device for storing programming instructions and data executed and used by the DSP 56 and/or MCU 52. The memory 50 may be a ROM, RAM, flash memory or the like. The memory 50 may include memory that is external to the PAN interface core 33.

Among other things, the memory 50 stores executable code for an upstream codec 58 and a downstream codec 60. The upstream codec code 58 is executed by the DSP 56 to encode the digitized stereo audio, and the downstream codec code 60 is executed by the DSP 56 to decode the digitized microphone signal. To reduce network latency in the audio and voice signals, the codecs 56, 58 are low-latency codecs. The codecs 56, 58 preferably each have a processing latency of less than 50 milliseconds, and are each implemented using FastStream codec firmware available from CSR, Plc. of Cambridge, U.K.

The memory 50 also stores executable code for causing the dongle 18 to simultaneously maintain two Bluetooth® A2DP connections to the headset 21. One of the A2DP connections is an upstream connection 30 for streaming the digitized stereo audio signal from the dongle 18 to the headset 21. The other A2DP connection is a downstream connection for streaming mono voice (the digitized microphone signal) from the headset 21 to the dongle 18.

The radio 42 includes an interface to the digital processing core 40 and a transceiver for transporting the digitized stereo audio and microphone signals over the wireless PAN link 24.

The RF signals output from the radio 42 pass through the antenna matching circuit 36, which is an RF impedance matching circuit, to the antenna 38. Although only one antenna is shown in FIG. 2, the dongle 18 may include separate antennas for transmitting and receiving.

The RF signals representing the digitized stereo audio from the dongle 18 are received at the antenna 76 of the headset module 12. Although only one antenna 76 is shown in FIG. 2, the headset module 12 may include separate antennas for transmitting and receiving.

The headset module 12 includes a PAN interface core 70 electrically coupled to an analog audio circuit 72 and an antenna matching circuit 74. The antenna matching circuit 74 is coupled to the antenna 76.

The RF signals from the antenna 76 pass through the antenna matching circuit 74, which is an RF impedance matching circuit, to the radio 80.

The radio 80 includes an interface to the digital processing core 78 of the PAN interface core 70, and a transceiver for transporting the digitized stereo audio and microphone signals over the wireless PAN link 24.

The PAN interface core 70 may be any suitable set of components for converting and digitally processing the microphone and stereo audio signals for transport over the wireless link 24. However, the PAN interface core 70 is preferably a system-on-a-chip solution, such as the BlueCore5-Multimedia chip available from CSR, Plc. of Cambridge, U.K., which provides a Bluetooth® core system consisting of a Bluetooth® RF transceiver, baseband processor, protocol stack, A/D and D/A converters, memory, DSP and codec resources, as well as hardware and software interfaces for connecting to the antenna matching circuit 74 and analog audio circuit 72.

In the example shown, the PAN interface core 70 includes the digital processing core 78, an analog-to-digital (A/D) converter 86, a first digital-to-analog (D/A) converter 82, a second D/A converter 84, and the radio 80. The A/D converter 86 samples the microphone signal at a rate 16 KHz. The digitized microphone signal from the A/D converter 86 is received by the digital processing core 78. The D/A converters 82, 84 receive the left and right digitized stereo audio signals, which are each sampled at a rate of 48 KHz, and they output the analog left and right stereo audio signals.

The digital processing core 78 includes at least one memory 88, a micro-controller unit (MCU) 90, and at least one digital signal processor (DSP) 92.

The memory 88 is any suitable memory device for storing programming instructions and data executed and used by the DSP 92 and/or MCU 90. The memory 88 may be a ROM, RAM, flash memory or the like. The memory 88 may include memory that is external to the PAN interface core 70.

Among other things, the memory 88 stores executable code for an upstream codec 94 and a downstream codec 96. The upstream codec code 94 is executed by the DSP 92 to decode the digitized stereo audio, and the downstream codec code 96 is executed by the DSP 92 to encode the digitized microphone signal. To reduce network latency in the audio and voice signals, the codecs 94, 96 are low-latency codecs. The codecs 94, 96 preferably each have a processing latency of less than 50 milliseconds, and are each implemented using FastStream codec firmware available from CSR, Plc. of Cambridge, U.K.

The memory 88 also stores executable code for causing the headset module 12 to simultaneously maintain the two A2DP connections to the dongle 18. One of the A2DP connections is the upstream connection 30 for streaming the digitized stereo audio signal from the dongle 18 to the headset 21. The other A2DP connection is the downstream connection 32 for streaming mono voice (the encoded, digitized microphone signal) from the headset 21 to the dongle 18.

The analog audio circuit 72 receives analog left and right stereo audio signals from the D/A converters 82, 84, respectively, and outputs left and right analog stereo audio signals to the headset speakers 22. The analog audio circuit 72 also receives an analog microphone signal from the headset microphone (mic) 20, and after processing this signal, passes it to the A/D converter 86. The incoming analog microphone signal may be a differential signal.

The analog audio circuit 34 may include amplifiers, filters and other suitable hardware for amplifying, filtering or otherwise processing the analog stereo and microphone signals.

The headset 21 and the dongle 18 are configured to use the enhanced data rate of Bluetooth® version 2.0 or later to enable sufficient wireless network bandwidth to simultaneously stream the stereo audio and voice over the two connections 30, 32.

Figure 3:
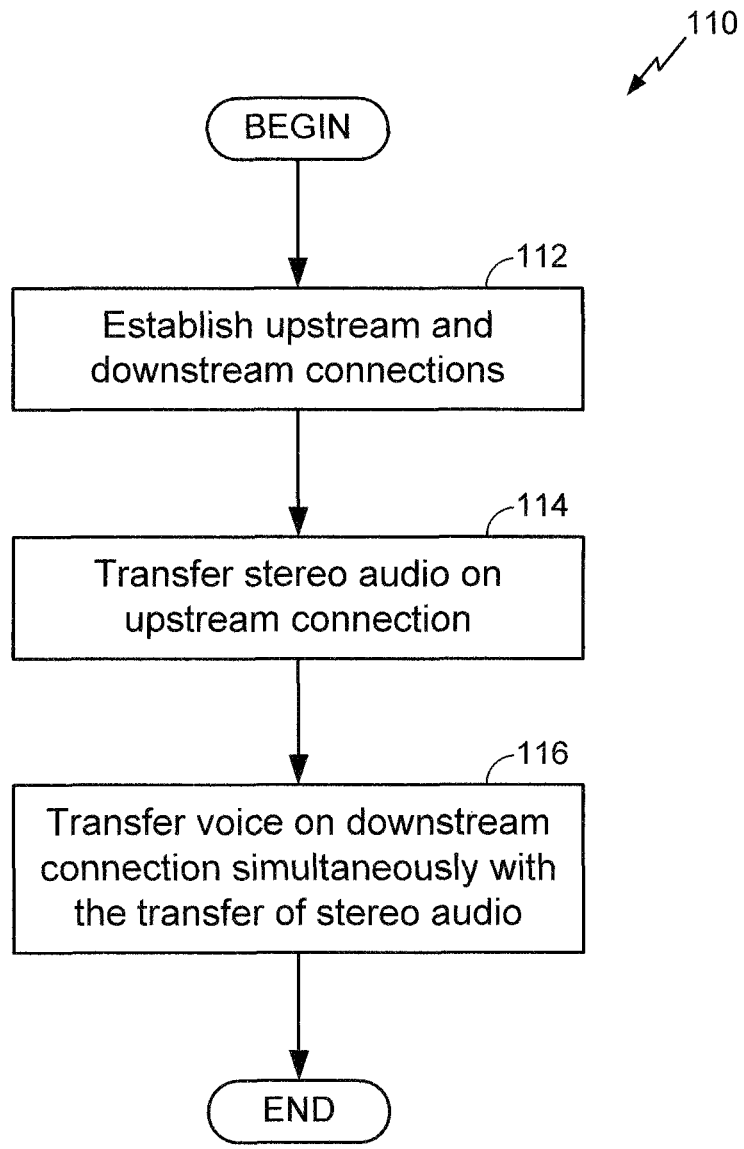
FIG. 3 is a flowchart illustrating an exemplary method of operating the headset and dongle of FIGS. 1 and 2.

FIG. 3 is a flowchart 110 illustrating an exemplary method of operating the headset 21 and the dongle 18 of FIGS. 1 and 2. In step 112, the upstream and downstream connections 30, 32 between the headset 21 and the dongle 18 are established over the wireless PAN. The PAN can be a Bluetooth® network, and each connection can be a Bluetooth® A2DP connection, simultaneously open between the headset 21 and the dongle 18. Next, in step 114, a digitized stereo audio signal from the dongle 18 is transmitted over the wireless upstream connection 30 to the headset 21. The digitized stereo audio may be encoded by a low-latency codec, e.g., FastStream, prior to being transmitted. In step 116, a digitized voice signal is transmitted from the headset 21 over the downstream connection 32 simultaneously with the transmission of the digitized stereo audio signal on the upstream connection 30. The digitized voice may be encoded by a low-latency codec, e.g., FastStream, prior to being transmitted.

In situations where the PAN bandwidth is not sufficient to satisfactorily support the simultaneous upstream and downstream streaming audio channels between the headset 21 and dongle 18, due to user-perceived audio latency, the transmissions between the headset 21 and dongle 18 can be temporally staggered. In these situations, this is accomplished by configuring the dongle 18 to transmit a predefined number of stereo audio packets, and then pause its transmission, while the headset 21 transmits a predefined number of microphone packets. The two devices 18, 21 can alternate transmissions, with the stereo audio being designated a greater amount of bandwidth. Each device 18, 21 can be configured to detect the transmission pauses of the other. The number of packets sent by each device during each of its transmission periods is determined so that the audio latency perceived by a listener is reduced.

The functionality of the systems, devices, dongles, headsets and their respective components, as well as the method steps and blocks described herein may be implemented in hardware, software, firmware, or any suitable combination thereof. The software/firmware may be one or more programs having sets of instructions (e.g., code segments) executable by one or more digital circuits, such as microprocessors, DSPs, embedded controllers, or intellectual property (IP) cores. If implemented in software/firmware, the functions may be embodied as instructions or code stored on one or more computer-readable media. Computer-readable medium includes computer storage medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. This may include a compact disc (CD), laser disc, optical disc, digital versatile disc (DVD), floppy disk and blu-ray disc. Combinations of the above should also be included within the scope of computer-readable medium.

Certain embodiments have been described. However, various modifications to these embodiments are possible, and the principles presented herein may be applied to other embodiments as well. For example, the principles disclosed herein may be applied to devices other than those specifically described herein. In addition, the various components and/or method steps/blocks may be implemented in arrangements other than those specifically disclosed without departing from the scope of the claims. Thus, other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A system, comprising:
   a vehicle audio system producing an analog stereo audio signal;
   a first device including:
      an interface for connecting to the vehicle audio system,
      an analog-to-digital converter for converting the analog stereo audio signal to a digitized stereo audio signal, and
      a wireless interface configured to simultaneously transmit the digitized stereo audio signal to and receive a digitized voice signal from a second device over a wireless personal-area network (PAN); and
   the second device configured to simultaneously receive the digitized stereo audio signal from the first device and transmit the digitized voice signal to the first device over the PAN.

2. The system of claim 1, wherein the first device includes a first audio codec for encoding the digitized stereo audio signal and a second audio codec for decoding the digitized voice signal; and wherein the second device include a third audio codec for encoding the digitized voice signal and a fourth audio codec for decoding the digitized stereo audio signal.

3. The system of claim 2, wherein the latency of each of the audio codecs is less than 50 milliseconds.

4. The system of claim 1, wherein the second device includes a digital-to-analog converter for converting the digitized stereo audio signal to an output analog stereo audio signal.

5. The system of claim 1, wherein the second device includes an analog-to-digital converter for converting an input analog voice signal to the digitized voice signal; and wherein the first device includes a digital-to-analog converter for converting the digitized voice signal to an output analog voice signal.

6. The system of claim 1, wherein the first device includes an analog matching circuit configured to receive the analog stereo audio signal from the vehicle audio system.

7. The system of claim 1, wherein the PAN is a Bluetooth® network and the system further comprises:
   means for establishing an upstream Bluetooth® connection between the first device and the second device on the Bluetooth® network;
   means for establishing, concurrently with the upstream Bluetooth® connection, a downstream Bluetooth® connection between the first device and the second device on the Bluetooth® network, the downstream Bluetooth® connection being separate from the upstream Bluetooth® connection;
   means for transmitting the digitized stereo audio signal from the first device to the second device over the upstream Bluetooth® connection; and
   means for transmitting the digitized voice signal from the second device to the first device over the downstream Bluetooth® connection.

8. The system of claim 1, wherein the first device is a dongle configured to plug into an analog audio jack of the vehicle audio system.

9. The system of claim 8, wherein the vehicle audio system is a motorcycle audio system supporting voice communications and stereo audio output.

10. The system of claim 1, wherein the second device is a wireless headset having a microphone for receiving an analog voice signal and means for converting the analog voice signal to the digitized for signal.

11. A system, comprising:
   a dongle configured to plug into an analog audio jack of a motorcycle audio system providing an analog audio signal, the dongle configured to receive the analog audio signal from and outputting an analog microphone signal to the motorcycle audio system through the jack, the dongle including means for converting the analog audio signal to a digitized audio signal and means for converting a digitized microphone signal to the analog microphone signal; and the dongle also configured to simultaneously transmit the digitized audio signal and receive the digitized microphone signal over a wireless personal-area network (PAN).

12. The system of claim 11, further comprising:
   a wireless headset configured to simultaneously receive the digitized audio signal from the dongle and transmit the digitized microphone signal to the dongle over the PAN.

13. The system of claim 12, wherein the wireless headset is built into a motorcycle helmet.

14. The system of claim 11, wherein the PAN is a Bluetooth® network and the dongle further comprises:
   means for establishing an upstream Bluetooth® connection between the dongle and a wireless headset on the Bluetooth® network;
   means for establishing, concurrently with the upstream Bluetooth® connection, a downstream Bluetooth® connection between the dongle and the wireless headset on the Bluetooth® network, the downstream Bluetooth® connection being separate from the upstream Bluetooth® connection;
   means for transmitting the digitized audio signal from the dongle to the wireless headset over the upstream Bluetooth® connection; and
   means for receiving the digitized microphone signal from the wireless headset to the dongle over the downstream Bluetooth® connection.

15. The system of claim 11, wherein the analog audio signal includes a stereo audio signal.

16. A method of wireless communication between two devices connected over a wireless personal-area network (PAN), comprising:
   establishing an upstream Bluetooth® A2DP connection between a first device and a second device on the wireless PAN;
   establishing, concurrently with the upstream Bluetooth® A2DP connection, a downstream Bluetooth® connection between the first device and the second device on the wireless PAN, the downstream Bluetooth® connection being separate from the upstream Bluetooth® A2DP connection;

transmitting a digitized stereo audio signal from the first device to the second device over the upstream Bluetooth® A2DP connection; and transmitting a digitized voice signal from the second device to the first device over the downstream Bluetooth® connection.

17. The method of claim 16, further comprising:

encoding the digitized stereo audio signal with a codec prior to transmitting the digitized stereo audio signal.

18. The method of claim 16, further comprising:

encoding the digitized voice signal with a codec prior to transmitting the digitized voice signal.

19. A non-transitory computer-readable medium embodying a set of instructions executable by one or more processors, comprising:

code for establishing an upstream Bluetooth® A2DP connection between a first device and a second device on a wireless personal-area network (PAN);

code for establishing, concurrently with the upstream Bluetooth® A2DP connection, a downstream Bluetooth® connection between the first device and the second device on the wireless PAN, the downstream Bluetooth® connection being separate from the upstream Bluetooth® A2DP connection;

code for transmitting a digitized stereo audio signal from the first device to the second device over the upstream Bluetooth® A2DP connection; and code for transmitting a digitized voice signal from the second device to the first device over the downstream Bluetooth® connection.

20. The computer-readable medium of claim 19, further comprising:

code for a codec that encodes the digitized stereo audio signal prior to transmission of the digitized stereo audio signal.

21. The computer-readable medium of claim 19, further comprising:

code for a codec that encodes the digitized voice signal prior to transmission of the digitized voice signal.

* * * * *